(12) United States Patent  
Garnier

(10) Patent No.: US 6,443,301 B2
(45) Date of Patent: Sep. 3, 2002

(54) CARTON AND CARTON BLANK

(75) Inventor: Jean-Michel Garnier, Issoudun (FR)

(73) Assignee: The Mead Corporation, Dayton, OH (US)

( * ) Notice: Subject to any disclaimer, the term of this patent is extended or adjusted under 35 U.S.C. 154(b) by 0 days.

(21) Appl. No.: 09/839,496

(22) Filed: Apr. 20, 2001

Related U.S. Application Data

(63) Continuation of application No. PCT/US99/24654, filed on Oct. 21, 1999.

(30) Foreign Application Priority Data

Oct. 21, 1998 (GB) ............................................. 9822972

(51) Int. Cl.⁷ ............................................. B65D 85/57
(52) U.S. Cl. .................. 206/312; 206/308.1; 229/67.3; 281/31
(58) Field of Search .............................. 206/312, 308.1, 206/307, 309, 311, 313, 232, 472, 775, 782; 281/31; 229/72, 75, 67.3

(56) References Cited

U.S. PATENT DOCUMENTS

| | | | |
|---|---|---|---|
| 877,060 A | | 1/1908 | Douglass ..................... 229/72 |
| 2,323,245 A | * | 6/1943 | Schenker .................... 206/311 |
| 2,776,085 A | | 1/1957 | Furey .......................... 229/69 |
| 3,556,391 A | * | 1/1971 | Kosterka .................... 206/311 |
| 3,717,297 A | | 2/1973 | Perry .......................... 229/72 |
| 3,817,445 A | | 6/1974 | Greason ....................... 229/70 |
| 3,870,223 A | | 3/1975 | Wyant .......................... 229/72 |
| 4,502,596 A | | 3/1985 | Saetre et al. ................. 206/466 |
| 4,709,812 A | | 12/1987 | Kosterka .................... 206/308.1 |
| 4,730,727 A | | 3/1988 | Petroff ....................... 206/311 |
| 4,762,225 A | | 8/1988 | Henkel ........................ 206/311 |
| 5,154,284 A | | 10/1992 | Starkey ....................... 206/311 |
| 5,188,229 A | | 2/1993 | Bernstein .................... 206/312 |
| 5,199,743 A | | 4/1993 | Rosinski, III ................. 281/45 |
| D336,367 S | * | 6/1993 | Morton ......................... D3/75 |
| 5,318,222 A | | 6/1994 | Bartlett ........................ 229/72 |
| 5,450,953 A | * | 9/1995 | Reisman ..................... 206/310 |
| 5,558,221 A | * | 9/1996 | Scior ....................... 206/308.3 |
| 5,669,491 A | | 9/1997 | Pettey ......................... 206/232 |
| 5,682,990 A | * | 11/1997 | Schluger .................. 206/308.1 |

FOREIGN PATENT DOCUMENTS

| | | |
|---|---|---|
| DE | 1536674 | 4/1970 |
| DE | 92 08 811.2 | 12/1992 |
| WO | 98/24640 | 6/1998 |

* cited by examiner

Primary Examiner—M. D. Patterson
Assistant Examiner—Jila M. Mohandesi
(74) Attorney, Agent, or Firm—Tsugihiko Suzuki

(57) ABSTRACT

A multi-sleeve booklet for holding flat objects includes a plurality of sleeves joined in series and folded upon each other in an accordion fashion, and a spine panel forming a spine of the booklet and hingedly interconnecting all the sleeves together. Each sleeve has a pair of front and back panels hingedly connected together. The front and back panels are secured in face to face contacting relationship while the spine panel is joined to one of the opposed outermost sleeves and secured to the other of the outermost sleeves.

11 Claims, 5 Drawing Sheets

CARTON AND CARTON BLANK

This is a continuation of international application No. PCT/US99/24654, filed Oct. 21, 1999, which is hereby incorporated by reference.

BACKGROUND OF THE INVENTION

The invention relates to a carton or sleeve for accommodating one or more articles, for example, information discs or the like, formed from one or more blanks of paperboard or other suitable foldable sheet material and more particularly to a multi-sleeve booklet capable of being formed into a plurality of sealed compartments comprising one or more disc pockets (or sleeves)

An example of a multiple sleeve formed from one or more blanks may be found in U.S. Pat. No. 5,318,222 which illustrates a mailer for discs: the mailer having first and second pockets for receiving discs, each pocket formed of front and back rectangular panel members joined to at least one pair of corresponding edges and connected on at least one pair of corresponding edges. The pockets hingedly attached by a spine at an edge of each of said pockets and there is a sealing member for adhering the first pocket to the second pocket. The resulting multiple sleeve can be harder to handle because it opens out to a long carrier.

SUMMARY OF THE INVENTION

The present invention and its preferred embodiment seek to overcome or least mitigate the problems of the prior art.

According to a first aspect of the invention, there is provided a multi-sleeve booklet for holding flat objects such as compact discs or the like, which booklet comprises a plurality of sleeves joined in series and folded upon each other in an accordion fashion. Each sleeve has a front panel hingedly connected to a back panel. The front and back panels are secured in face-to-face contacting relationship by securing means. A spine panel is provided to form the spine of the booklet and to hingedly interconnect all the sleeves together. The spine panel is joined to one of the opposed outermost ones of the sleeves and secured to the other of the outermost sleeves.

According to an optional feature of this aspect of the invention, said plurality of sleeves may be folded in the accordion fashion such that each of the opposed outermost sleeves is connected to a next adjacent sleeve by a fold line along lower edges thereof. Each of the next adjacent sleeves may be connected to a next adjacent sleeve by a fold line along upper edges thereof.

According to another optional feature of this aspect of the invention, the sleeves are joined in series such that each of the opposed outermost sleeves is hingedly connected at its front panel to the front panel of a next adjacent sleeve, and each of the next adjacent sleeves is hingedly connected at its back panel to the back panel of a next adjacent sleeve.

According to another optional feature of this aspect of the invention, at least part of one of the front and back panels of at least one of the sleeves may be cut away to facilitate access to the contents of that sleeve.

According to yet another optional feature of this aspect of the invention, the spine panel may be formed from one of the sleeves adjacent to the one outermost sleeve.

According to a further optional feature of this aspect of the invention, the spine panel may be formed from the back panel of one of the sleeves adjacent to the one outermost sleeve and joined to the back panel of the one outermost sleeve.

According to a still further optional feature of this aspect of the invention, there further comprises an outer cover adapted to receive and retain the booklet in a closed condition.

A second aspect of the invention provides a blank for forming a multi-sleeve booklet for holding flat objects. The blank comprises a plurality of front panels positioned in series and hingedly connected to adjacent corresponding back panels. There is a sequence of parallel fold lines connecting in staggered sequence a pair of front panels then a pair of back panels. A spine panel for forming the spine of the booklet is joined to one of the endmost back panels and arranged to be secured to the opposite endmost back panel and securing means for connecting each front panel with the corresponding adjacent back panel.

BRIEF DESCRIPTION OF THE DRAWINGS

Exemplary embodiments of the invention will now be described, by way of example only, with reference to the accompanying drawings in which.

DETAILED DESCRIPTION OF THE PREFERRED EMBODIMENT

Figure 1:
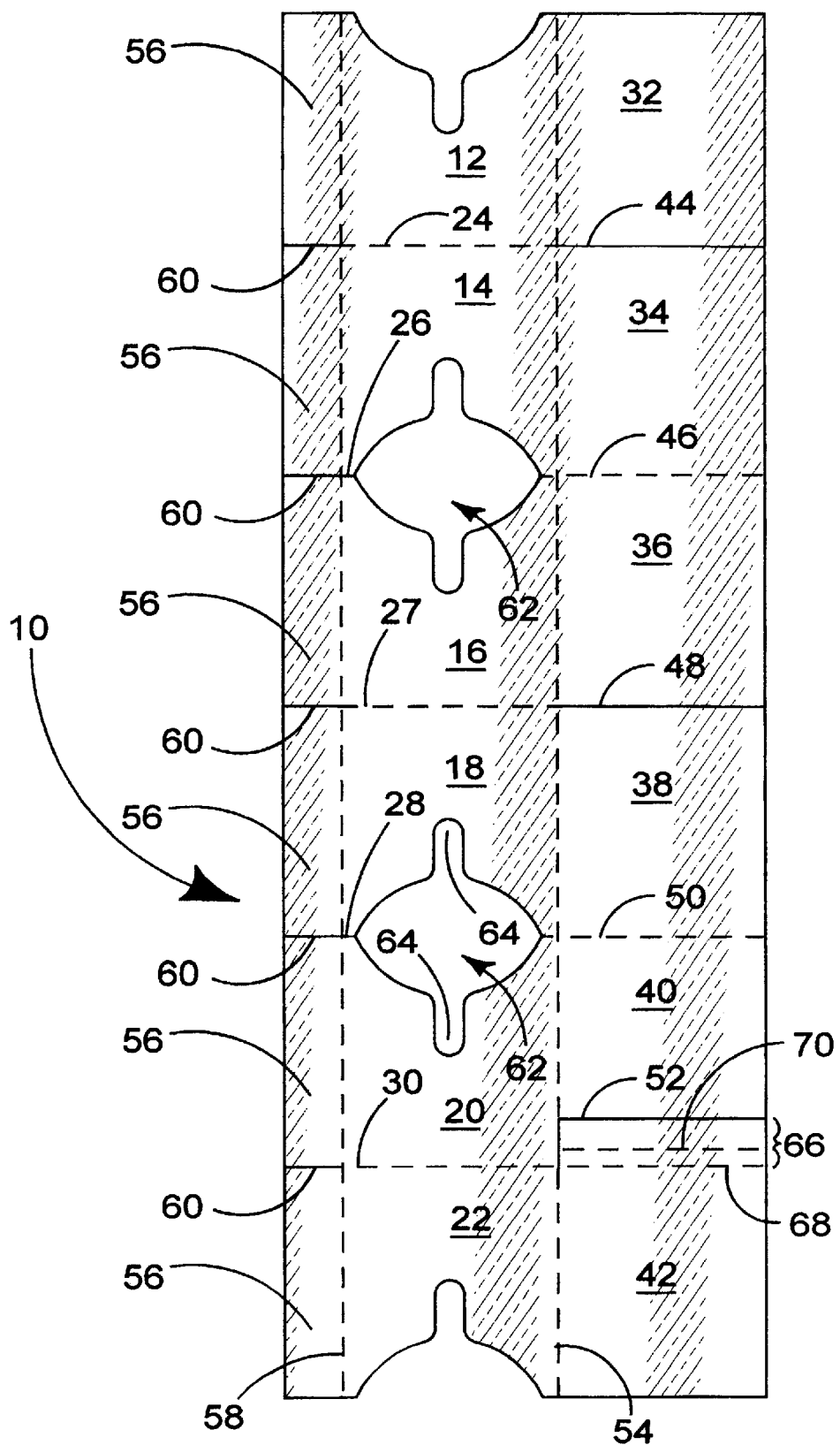
FIG. 1 is a plan view of a blank for forming a booklet-style multi-sleeve carton according to a preferred embodiment of the invention.

Referring first to FIG. 1, there is shown a blank 10 forming a carton or multi-sleeve booklet for holding a plurality of articles, for example information discs or the like, made from one or more blanks of paperboard or similar foldable sheet material for example plastics material. Each sleeve comprises a front panel and a back panel which are preferably secured together. The blank 10 comprises a plurality of front panels 12, 14, 16, 18, 20 and 22 arranged in series. In this embodiment, front panels 12, 16, and 20 are hingedly connected to front panels 14, 18 and 22 respectively along fold lines 24, 27, and 30 and front panels 14, 18 are separated from front panels 16 and 20 respectively by cut lines 26 and 28.

There further comprises a plurality of back panels 32, 34, 36, 38, 40 and 42 positioned in series adjacent their respective front panels 12, 14, 16, 18, 20, 22 and hingedly connected thereto along a common longitudinal fold line 54. In this embodiment, back panels 34, 36; 38, 40 are hingedly connected together along fold lines 46 and 50 respectively: fold lines 46 and 50 are co-extensive with cut lines 26 and 28. It will be seen from FIG. 1 that back panel 32 is separated from back panel 34 by cut line 44 and likewise, back panels 36 and 40 are separated from back panels 38 and 42 respectively by cut lines 48 and 52.

In another class of embodiments a plurality of panels may be hingedly connected together in series to form in alternating sequence: the front panel of one sleeve being hingedly connected to the back panel of the next adjacent sleeve and so forth. There may further comprise a second set of panels adjacent to and hingedly connected to the panels folded in series. The second set of panels may form the corresponding one of either the front or back panels. Preferably, each of the second set of panels is separated from the adjacent panels in the second set by cut lines. The panels may be folded in "accordion like" fashion, as hereinafter described.

It is envisaged that other modifications can be made, for example, the remaining features described below may be incorporated into the class of embodiments described in the preceding paragraph without departing from the scope of invention.

Figure 4:
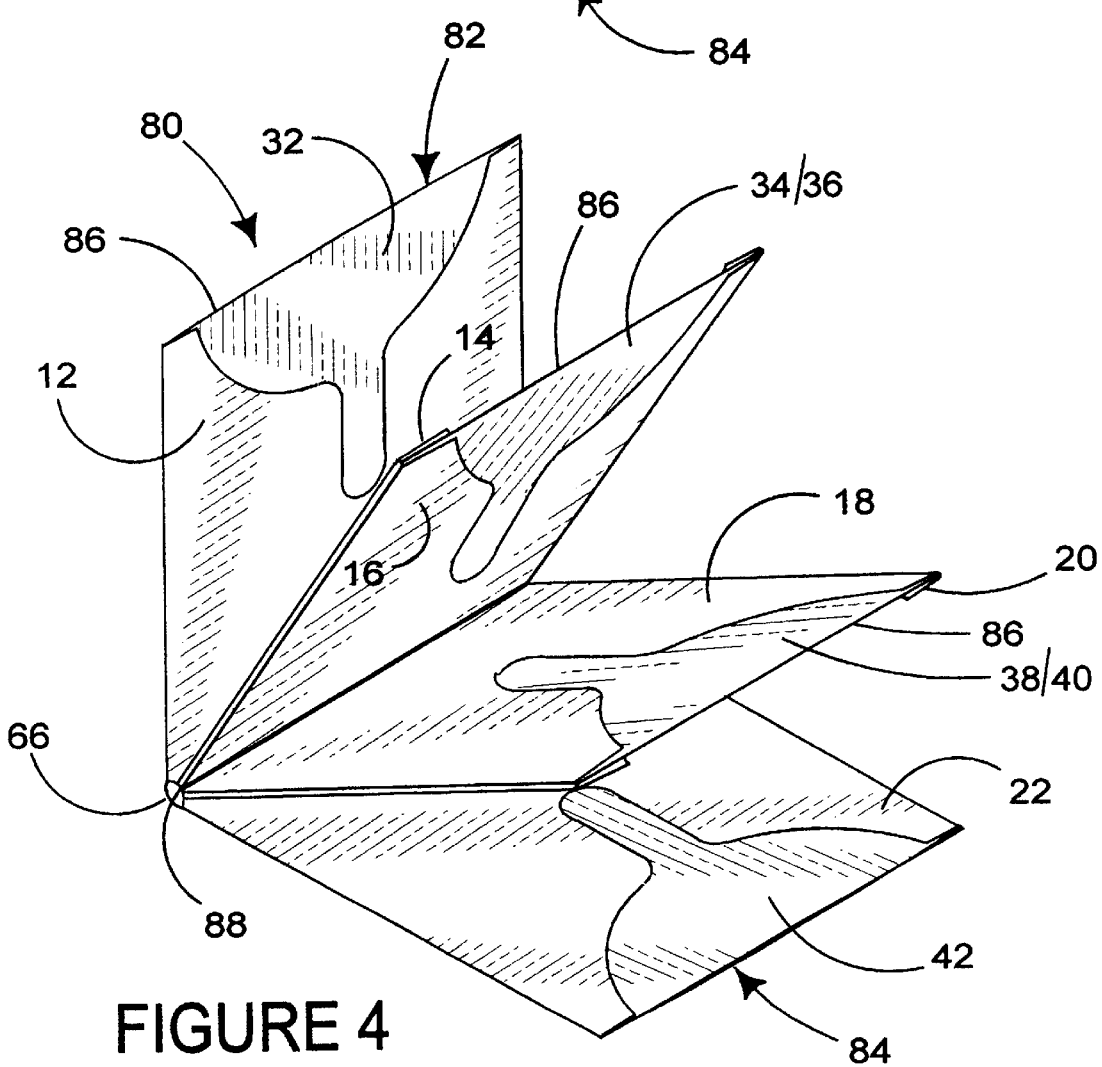

It will be seen from FIG. 1 that there may further comprise a plurality of apertures 62 interrupting cut lines 26 and 28 and struck from front panels 14, 16 and 18, 20. The apertures 62 are adapted to provide a display face to show part of a disc contained in the or each sleeve, as shown in FIG. 4. The apertures 62 may further comprise one or more recesses 64 to allow a user access to a disc contained in the sleeve, when in use. Optionally, the back panels 32 to 42 may extend beyond the disc contained in the or each sleeve to provide support and to protect the disc should the sleeve be accidentally dropped.

Securing means is provided to secure the front and back panels 12 to 22; 32 to 42 of each sleeve together: in this embodiment the securing means comprises a plurality of side flaps 56 hingedly connected to a side edge of corresponding front panels 12 to 22 along a common longitudinal fold line 58. Adjacent side flaps 56 are preferably separated by cut lines 60.

There may further comprise a spine panel for hingedly connecting the sleeves together. FIG. 1 shows a spine panel 66 intermediate back panels 40 and 42 and hingedly connected to the back panel 42 of an outermost sleeve 84 (FIGS. 3 and 4) along transverse fold line 68. The spine panel 66 is formed from the back panel 40 of a sleeve adjacent to the outermost sleeve 84 and is so constructed to be securably joined to the back panel 32 of the opposed outermost sleeve 82 (FIGS. 3 and 4) formed by front and back panels 12 and 32 described below. In this embodiment, spine panel 66 comprises second fold line 70 to define a securing flap adjacent the end edge of the outer spine panel 66.

It is envisaged that the size and/or shape of the sleeve can be altered according to manufacturing or user requirements. For example, the height or width of the panels can be increased or decreased according to the size of disc to be held by the sleeve.

Figure 2:
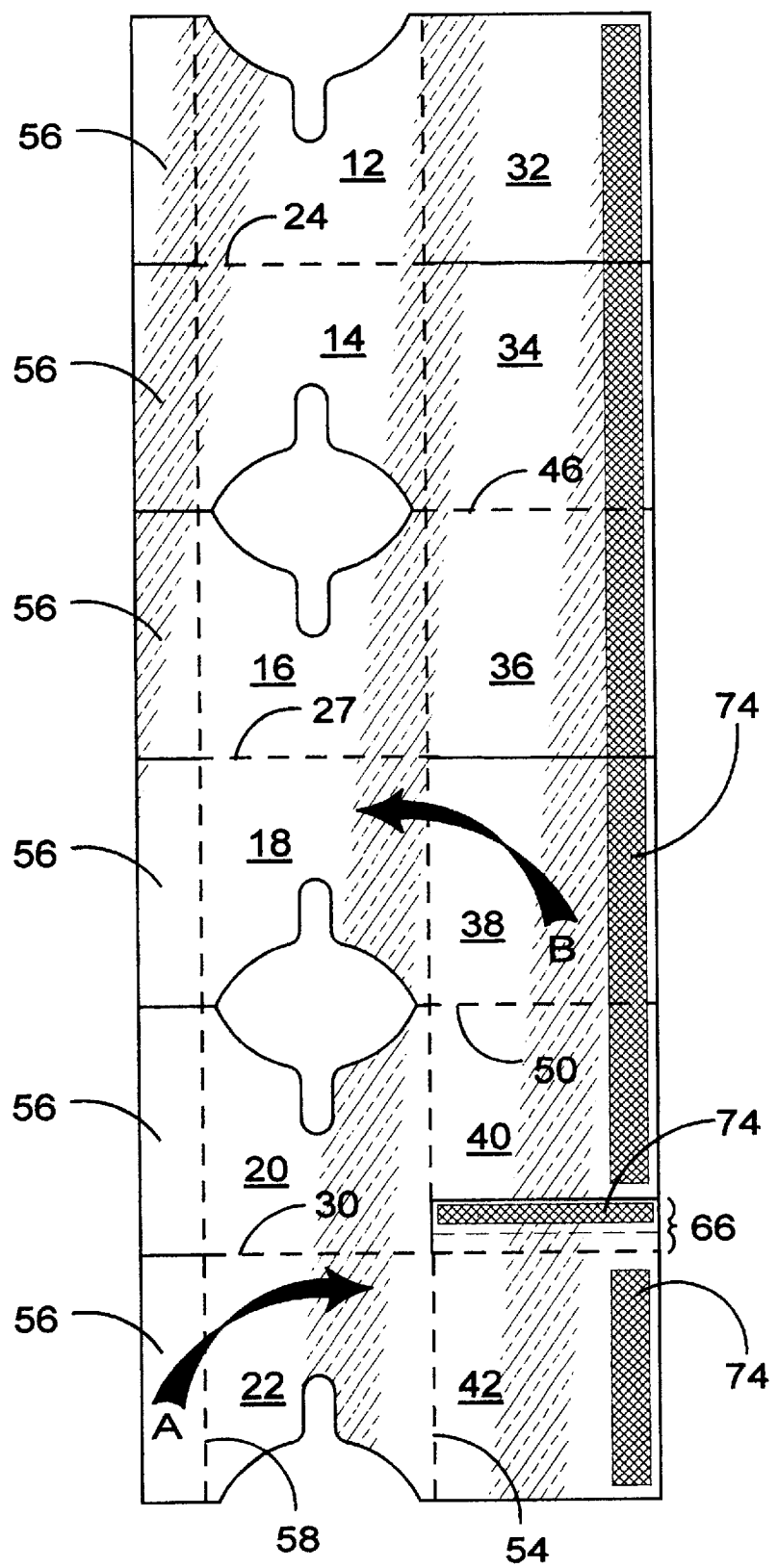
FIG. 2 a plan view of the blank of FIG. 1, illustrating the process of folding the blank to set up the carton.

The construction the carton is illustrated with reference to FIGS. 2, 3 and 4: as described above, suitable securing means is used to connect the front and back panels 12 to 22; 32 to 42 of each sleeve. In this embodiment, glue is first applied adjacent the free side edges shown as reference 74 of back panels 32 to 42. Furthermore, glue 74 is applied to the glue flap of spine panel 66, as shown in FIG. 2. Thereafter, side flaps 56 are folded about longitudinal fold line 58 in direction A, so that the inner faces of side flaps 56 are moved into face contacting relationship with respective front panels 12 to 22. Back panels 32 to 42 are folded about longitudinal fold line 54 in direction B into face contacting relationship with the outer faces of side flaps 56 and are secured together by glue 74 or other means known in the art.

Figure 3:
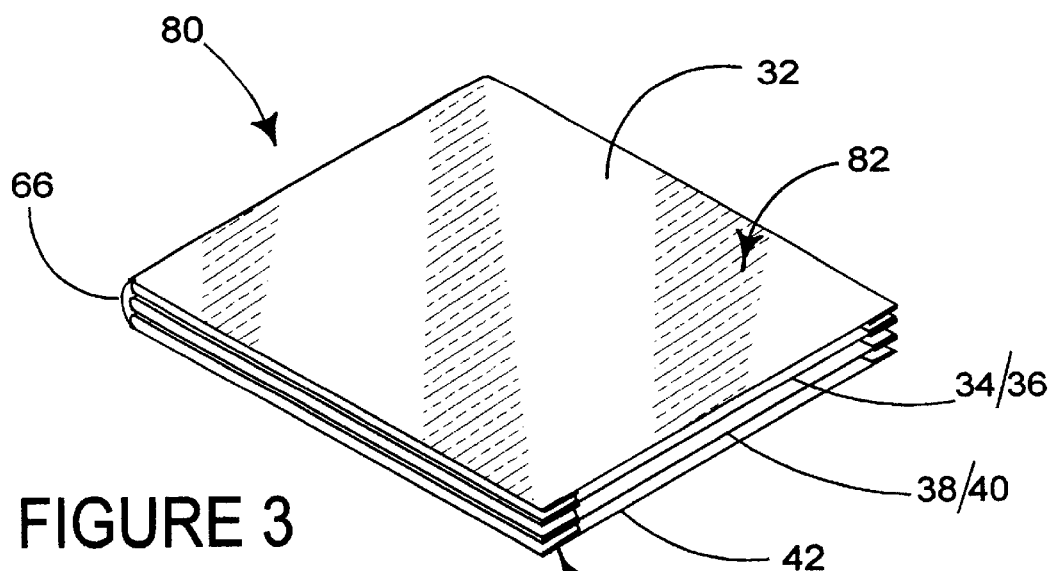
FIGS. 3 and 4 are perspective views of the carton formed from the blank shown in FIG. 1.

To form the multi-sleeve booklet 80, the part formed carton is folded in an "accordion like" fashion shown in FIGS. 3 and 4: whereby the outermost sleeve 82 formed from panels 32 and 12 are folded about fold line 24 and into face contacting relationship with the adjacent sleeve formed from panels 14 and 34 such that, panels 12 and 14 are juxtaposed. The next adjacent sleeve formed from panels 16 and 36 are folded about fold line 46 so that the sleeves formed from panels 14, 34 and 16, 36 respectively are folded into face contacting relationship with each other. Preferably, the faces of back panels 34 and 36 are placed in face contacting relationship and are secured together by glue or other means known in the art, shown in FIG. 4.

Thereafter, the sleeve formed from panels 18 and 38 is folded about fold line 27 into face contacting relationship with the adjacent sleeve formed from panels 16 and 36 with front panels 18 and 16 in juxtaposed relationship. Likewise, sleeves formed from panels 18, 38 and 20, 40 respectively are brought into face contact relationship with each other by folding about fold line 50 so that back panels 38 and 40 may be secured together. The outermost sleeve 84 formed from panels 22 and 42 is folded about fold line 30 so that front panels 20 and 22 come into face contacting relationship with each other. Thus, the carton is constructed as shown in FIG. 3 with the disc pockets or sleeves being connected together to define the upper edges 86 and the lower edges 88 of the booklet 80.

Thereafter, the outer spine panel 66 is folded about fold lines 68 and 70 such that the glue flap is brought into abutment with the outer panel 32 of the opposing outermost sleeve 82 formed from front and back panels 12 and 32. Thus, the carton is in the set up condition shown in FIG. 4 and can be supplied to the user to provide a multi-sleeve booklet for disc or other like objects.

Beneficially in those embodiments where the board is coated on one side or where printed matter is applied to one side only, the folding process hereinbefore described provides a booklet in which the coated printed sides are exposed on all of the outer surfaces.

It is envisaged that the carton of the present invention can be formed by a series of sequential folding and gluing operations which can be formed in a straight line machine so that the carton is not required to be rotated or inverted to complete its construction. The folding processes are not limited to that described below and can be altered according to particular manufacturing requirements.

Figure 5:
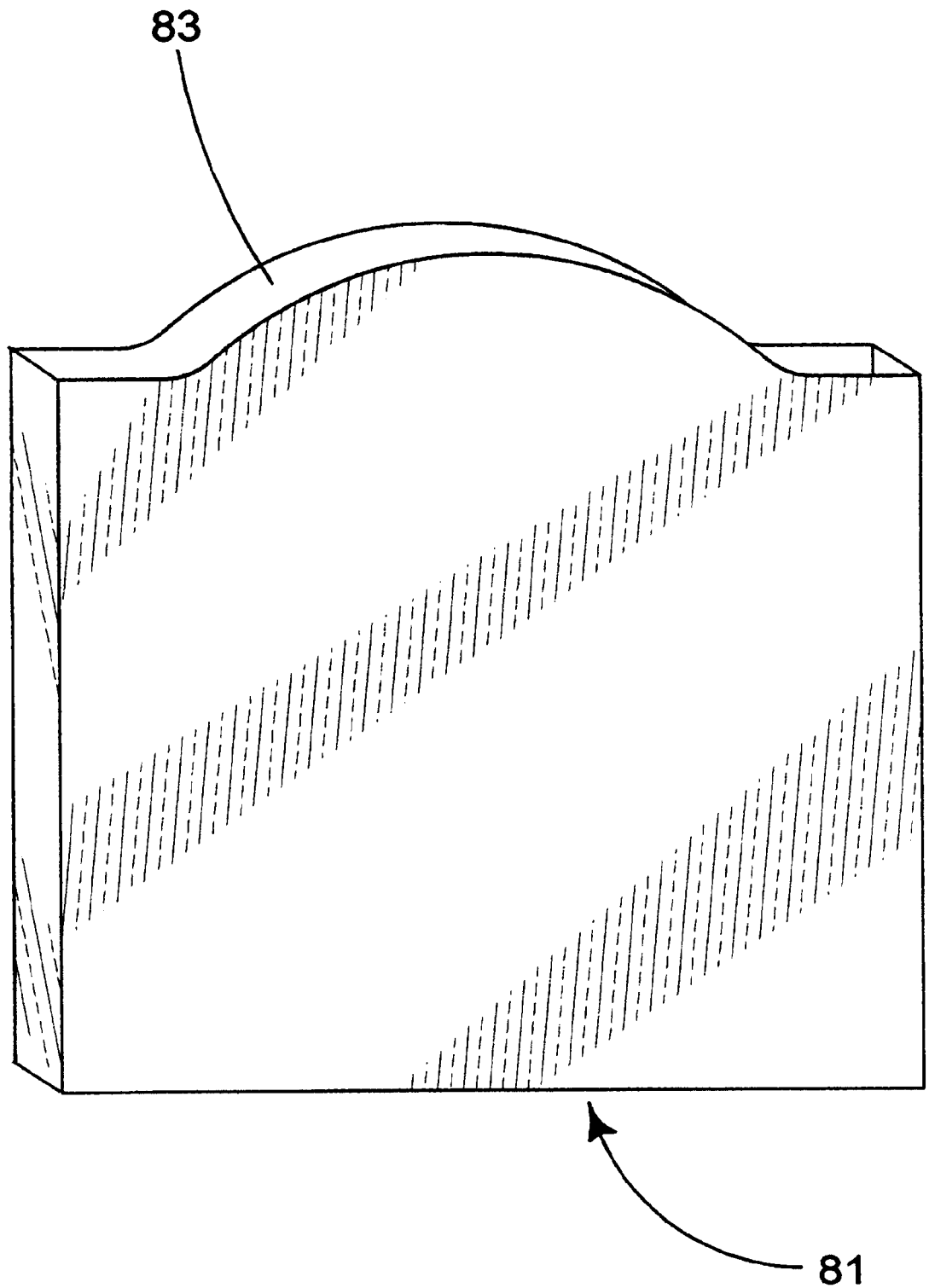
FIG. 5 is a perspective view of an outer cover for receiving the carton illustrated in FIGS. 3 and 4.
Figures 6A, 6B:
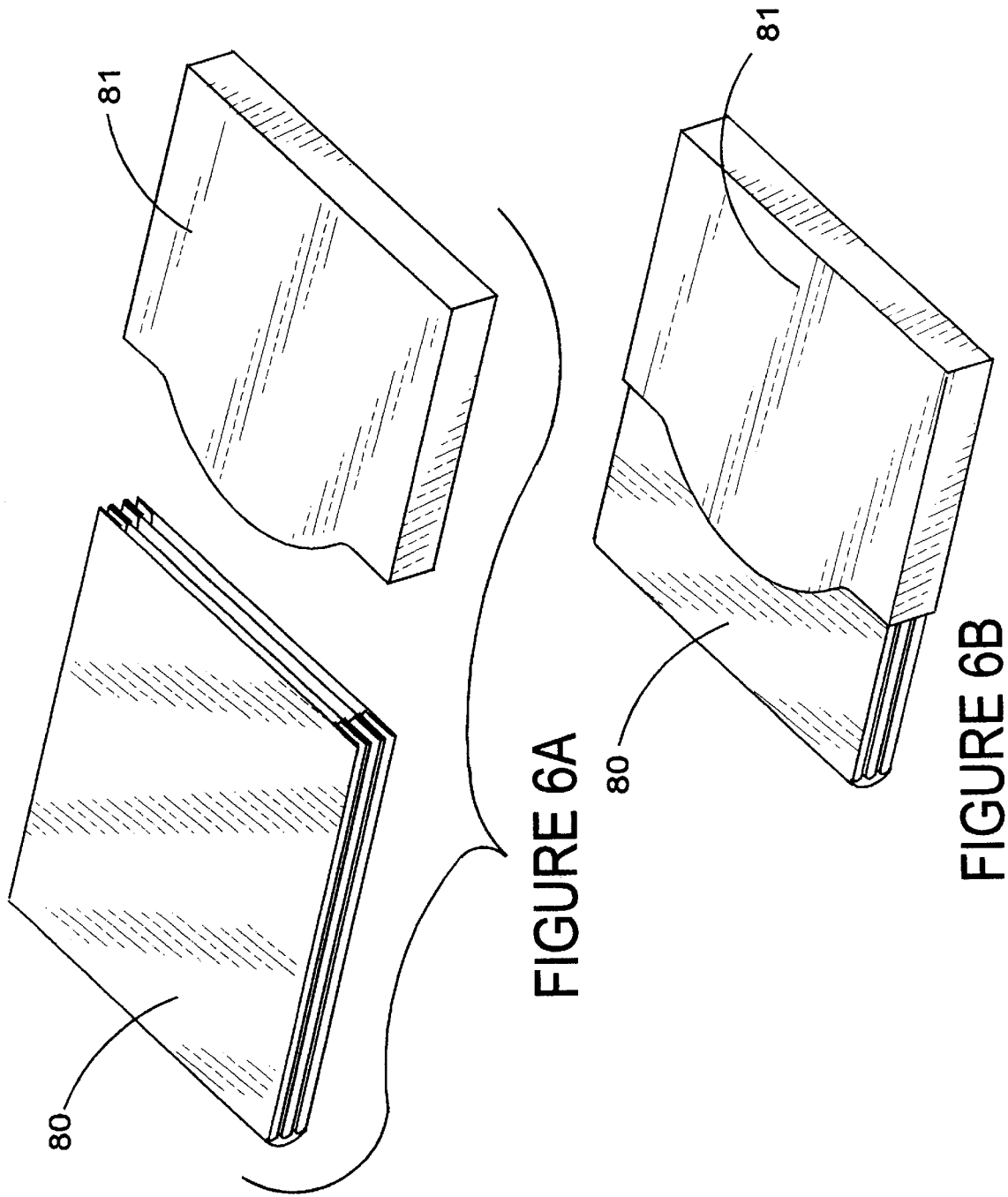
FIG. 6A is a perspective view of the carton in FIG. 3 and the outer cover in FIG. 5 in a separated condition.
FIG. 6B is a perspective view of the carton and outer cover in FIG. 6A in a combined form.

It is desirable for cartons containing information discs to be enclosed to protect the or each disc. Furthermore, the carton should preferably be reclosable to allow it to be re-used. In one class of embodiments, there may comprise an outer cover 81 shown in FIG. 5 so constructed to be used in conjunction with the multi-sleeve booklet 80 of the embodiments described above. The outer cover 81 can keep the booklets in a closed condition and prevent unwanted removal of the discs. As shown in FIGS. 6A and 6B, the multi-sleeve booklet 80 is inserted into the open end of the tubular structure of the outer cover 81 through aperture 83 and can be held in place by suitable securing means known in the art.

Advantageously, the embodiment of the invention hereinbefore described provides a structure that is sufficiently strong to retain articles and to provide an integral base. The use of paperboard material provides a degradable alternative to known sleeves formed from plastic material and the sleeves made from paperboard can include printed matter for marketing purposes.

It will be recognized that as used herein, directional references such as "top", "base", "end", and "side" do not limit the respective panels to such orientation, but merely serve to distinguish these panels from one another. Any reference to hinged connection should not be construed as necessarily referring to a single fold line only: indeed it is envisaged that hinged connection can be formed from one or more of one of the following, a score line, a frangible line or a fold line, without departing from the scope of invention.

The present invention and its preferred embodiment relate to a carton or multi-sleeve booklet which is shaped to provide satisfactory rigidity to hold items such as compact discs with a degree of flexibility. The shape of the blank minimises the amount of paperboard required for the carton. The carton can be constructed from a flat collapsed condition to a position of use by hand or automatic machinery. It is anticipated that the invention can be modified, without departing from the scope of invention, for example, the panels of the blank of the invention may be arranged such that the front panels are hingedly connected together in series and corresponding back panels being connected to respective front panels, but otherwise separated from adjacent back panels. Thus, the individual fold lines connecting all the sleeves together are formed in series rather than out of alignment with the front and back panels being connected alternately in series, without departing from the scope of invention.

What is claimed is:

1. A multi-sleeve booklet for holding flat objects, comprising three or more sleeves joined in series and folded upon each other in an accordion fashion, and a spine panel forming a spine of the booklet and hingedly interconnecting all the sleeves together, each sleeve having a pair of front and back panels hingedly connected together, the front and back panels being secured in face to face contacting relationship, the spine panel being joined to one of the opposed outermost ones of the sleeves and secured to the other of the outermost sleeves, wherein the spine panel is formed from one of the sleeves adjacent to the one outermost sleeve.

2. The multi sleeve booklet as claimed in claim 1 wherein said sleeves are folded in the accordion fashion such that each of the opposed outermost sleeves is connected to a next adjacent sleeve by a fold line along lower edges thereof and wherein each of said next adjacent sleeves is connected to a next adjacent sleeve by a fold line along upper edges thereof.

3. The multi sleeve booklet as claimed in claim 1 wherein said sleeves are joined in series such that each of the opposed outermost sleeves is hingedly connected at the front panel thereof to the front panel of a next adjacent sleeve, and each of said next adjacent sleeves is hingedly connected at the back panel thereof to the back panel of a next adjacent sleeve.

4. The multi-sleeve booklet as claimed in claim 1 wherein at least part of one of the front and back panels of at least one of the sleeves is cut away to facilitate access to contents of that sleeve.

5. The multi-sleeve booklet as claimed in claim 1 wherein the spine panel is formed from the back panel of the adjacent sleeve and hingedly joined to the back panel of the one outermost sleeve.

6. The multi-sleeve booklet as claimed in claim 5 wherein the spine panel is secured to the back panel of the other outermost sleeve.

7. The multi-sleeve booklet as claimed in claim 1, further comprising a outer cover disposed along an exterior of the plurality of sleeves to retain the sleeves in a closed condition.

8. The multi-sleeve booklet as claimed in claim 1 wherein the spine panel comprises a spine strip hingedly connected to the one outermost sleeve along a first fold line and a securing flap hingedly connected to the spine strip along a second fold line for attachment to the other outermost sleeve.

9. A blank for forming a multi-sleeve booklet for holding flat objects, comprising a plurality of front panels positioned in series and hingedly connected to adjacent corresponding back panels, a sequence of parallel fold lines connecting in staggered sequence a pair of front panels then a pair of back panels, a spine panel for forming a spine of the booklet, the spine panel being joined to one of opposite endmost ones of the back panels and arranged to be secured to the other endmost back panel, and a securing flap for connecting each of the front panels to a corresponding adjacent one of the back panels.

10. The blank as claimed in claim 9 wherein the securing flap is hingedly connected to the each front panel and secured to the corresponding adjacent back panel to form a respective sleeve.

11. The blank as claimed in claim 9 wherein the spine panel is formed from one of said back panels adjacent to the one endmost back panel.

* * * * *